United States Patent [19]
Gerber

[11] Patent Number: 5,067,378
[45] Date of Patent: Nov. 26, 1991

[54] BLADE FOR CUTTING SHEET MATERIAL AND RELATED CUTTING METHOD

[75] Inventor: Heinz J. Gerber, West Hartford, Conn.

[73] Assignee: Gerber Garment Technology, Inc., Tolland, Conn.

[21] Appl. No.: 619,296

[22] Filed: Nov. 28, 1990

Related U.S. Application Data

[62] Division of Ser. No. 370,649, Jun. 23, 1989, Pat. No. 4,991,481.

[51] Int. Cl.$^5$ .......................... B26D 7/27; D06H 7/00
[52] U.S. Cl. ....................................... 83/13; 83/174.1; 83/697; 51/327; 76/101.1
[58] Field of Search ............... 83/13, 174, 174.1, 697; 76/101.1, 82, 85; 51/247, 327; 30/350, 357

[56] References Cited

U.S. PATENT DOCUMENTS

| | | | |
|---|---|---|---|
| 4,653,373 | 3/1987 | Gerber | 83/174 X |
| 4,732,064 | 3/1988 | Pearl | 83/174 X |
| 4,984,492 | 1/1991 | Gerber | 83/174.1 X |

*Primary Examiner*—Frank T. Yost
*Assistant Examiner*—Rinaldi Rada

*Attorney, Agent, or Firm*—McCormick, Paulding & Huber

[57] ABSTRACT

In a reciprocating blade for cutting sheet material, a lower cutting part includes a forward cutting edge defining portion and a rear body portion. The body portion has two parallel side faces. The cutting portion has first, second, third and fourth side surfaces. The first side surface is located in a reference plane parallel to and mid-way between the side faces of the body portion. The fourth side surface is in the same plane as one of the side faces of the body portion. The second side surface is inclined to the reference plane, extends between one side face of the body portion and the first side surface, and intersects the first side surface to define the cutting edge. The third side surface is inclined to the reference plane and extends from the rear of the first side surface to the other side face of the body portion. At least the first side surface is covered with a layer of hard material. During use of the blade the second side surface is periodically sharpened. As a result of this construction and method of use the cutting edge is provided by the hard material, the cutting edge remains on the middle reference plane throughout the service life of the blade, and the lateral forces imposed on the blade by the cut material are substantially balanced throughout the service life of the blade.

2 Claims, 3 Drawing Sheets

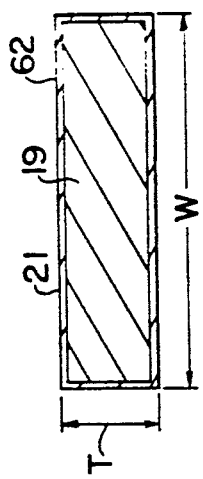
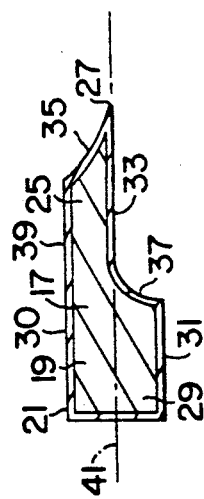

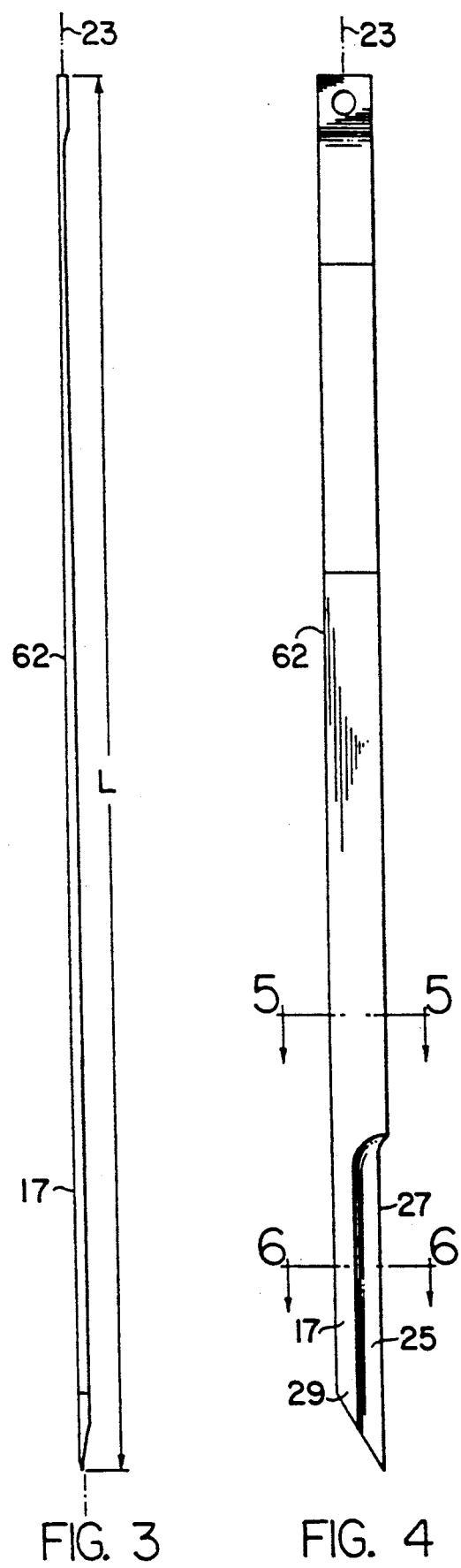

BLADE FOR CUTTING SHEET MATERIAL AND RELATED CUTTING METHOD

This is a divisional of co-pending application Ser. No. 07/370,649 filed on June 23, 1989 now U.S. Pat. No. 4,991,481.

RELATED APPLICATION

As to subject matter, this application is related to that of an application being filed concurrently herewith, by the same inventor as that of this application, and entitled CUTTING BLADE AND METHOD FOR CUTTING SHEET MATERIAL.

BACKGROUND OF THE INVENTION

This invention relates to the machine cutting of fabric or other sheet material, spread on a supporting surface, by means of a reciprocating cutter blade reciprocated along a reciprocation axis generally perpendicular to the sheet material while the blade is in cutting engagement with the material and moved forwardly along a desired line of cut, and deals more particularly with the construction of a blade used for such cutting and with a related method for using and sharpening the blade.

As to its construction, the blade of this invention in at least one of its aspects is of the general type shown by U.S. Pat. No. 4,653,373 wherein the base material of the blade at least in the vicinity of the cutting edge is covered with a thin coating of hard material which after sharpening of the blade is located at and defines the cutting edge so as to make the cutting edge more enduring and wear resistant than if defined by the softer base material. The present invention involves an improvement of the basic blade construction shown by said patent and also involves an improvement in its method of use.

In cutting machines controlled by automatic controllers, the cutting edge of the cutting blade before use of the blade is usually located on a reference plane passing through the middle of the blade thickness and then, as the blade is used, during sharpening cycles both sides of the blade are ground to maintain the cutting edge on the reference plane. In the blade shown by the aforesaid patent, however, the cutting edge is initially approximately on the reference plane and then during use of the blade only one side of it is sharpened by grinding, so that as a result of repeated sharpenings the cutting edge gradually moves further and further away from the reference plane. The blade thus cuts with precise accuracy only when first installed in a cutting machine and gradually loses such precise accuracy during the course of its service life. Further, when the blade is first installed the shape of the blade is generally symmetrical with respect to a first front to rear plane passing through the cutting edge so that the lateral forces imposed by the sheet material being cut on the blade are basically balanced and do not tend to laterally deflect the blade; but as the blade is repeatedly sharpened this symmetry and balance are gradually lost.

Further, the service life of the blade shown in the aforesaid patent is restricted by the fact that the blade can be used and sharpened only throughout the period during which the cutting edge moves from the reference plane to some limit of displacement from the reference plane.

The general object of this invention is therefore to provide an improved blade, which may be hard coated, and a related method of using the blade, whereby the blade is capable of cutting with acceptable accuracy throughout a much longer service life than the service life of previously known blades of the same general type.

Another object of the invention is to provide a blade of the foregoing character wherein the lateral forces imposed on the blade by the sheet material being cut remain basically balanced throughout the service life of the blade.

Other objects and advantages of the invention will be apparent from the following description of a preferred embodiment of the invention and from the accompanying drawings and claims.

SUMMARY OF THE INVENTION

The invention resides in a blade for cutting sheet material spread on a supporting surface, and a related method for using the blade, wherein the blade has a lower cutting part in turn having a forward cutting edge providing portion and a rear body portion with two parallel side faces. The cutting edge is located in a plane passing through the middle of the body portion thickness parallel to the side faces. The cutting edge is defined by two intersecting side surfaces, the first one of which is in the reference plane and the second one of which is inclined to the reference plane, extends from the cutting edge to a fouth side surface located in the same plane as one side face of the body portion, and is sharpened during sharpening of the blade. A third side surface, also inclined relative to the reference plane extends from the rear end of the first side surface to the other side face of the body portion.

In accordance with a further aspect of the invention, the first side surface is coated with a thin coating of hard material harder than the base material of the blade so that as the second side surface is sharpened the cutting edge becomes defined substantially entirely by the hard material.

Because of the location of the first side surface in the reference plane, as the second surface is repeatedly sharpened the cutting edge moves gradually rearwardly toward the body portion but remains located on the reference plane. As a result of this, the blade cuts with substantially the same precise accuracy throughout its service life and the lateral forces imposed on it likewise remain basically balanced throughout its service life.

BRIEF DESCRIPTION OF THE DRAWINGS

FIG. 1 is a fragmentary perspective view of a cutting machine using a cutting blade embodying the present invention.

FIG. 3 is a rear view of the blade of FIG. 1.

FIG. 4 is a side view of the blade of FIG. 1.

FIG. 5 is a transverse sectional view taken on the line 5—5 of FIG. 4.

FIGS. 6, 7, 8 and 9 are transverse sectional views taken on the line 6—6 of FIG. 4 and showing the blade at successive different points in its service life.

DETAILED DESCRIPTION OF THE PREFERRED EMBODIMENT

Figure 2:
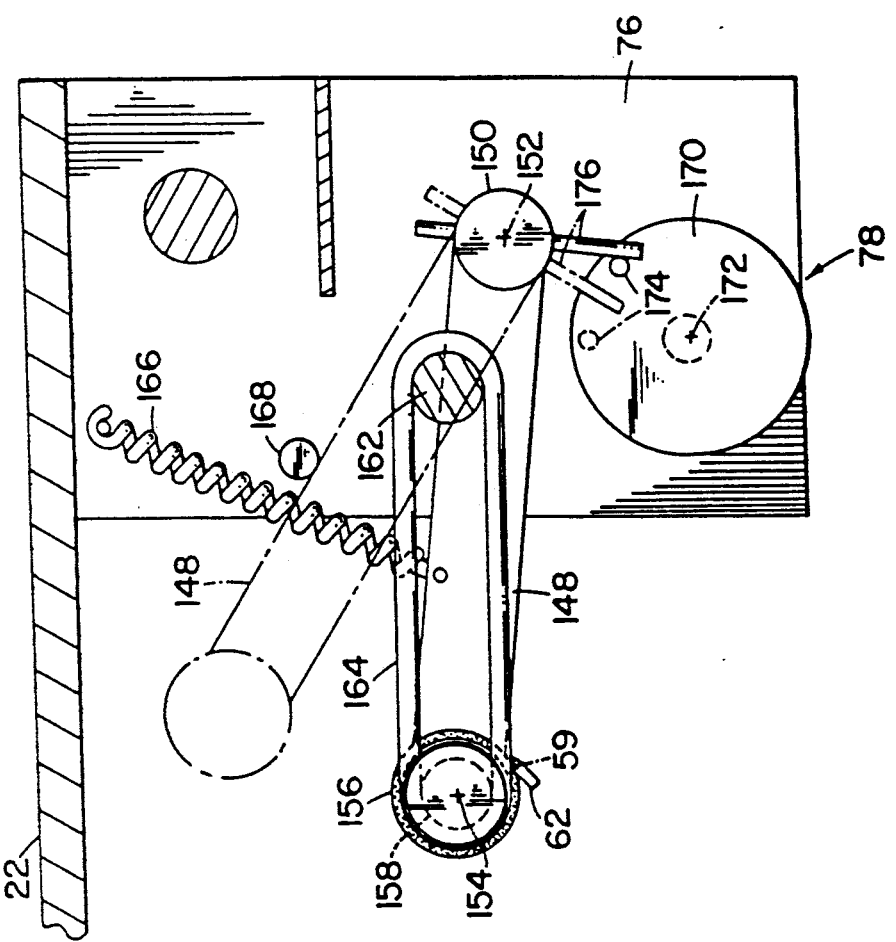
FIG. 2 is a plan view of the sharpening mechanism of the FIG. 1 machine.

For the purposes of this description, the blade of the invention is taken to be a blade of substantially the same size and shape as that shown in pending U.S. Patent Application Ser. No. 06/861,148 filed May 8, 1986 and entitled CUTTER HEAD AND KNIFE FOR CUTTING SHEET MATERIAL, and the cutting machine with which the blade is used is taken to be generally similar to the cutting machine shown by that application. Reference is accordingly made to said application for further details of the construction of the associated cutting machine.

For the present purposes, it is sufficient to note that in the accompanying drawings a blade embodying the invention is shown at 62 and is illustrated in use with a cutting head 12 of a sheet material cutting machine for cutting fabric or similar sheet material to be cut, as indicated at 14, supported by a supporting surface 16 provided by a bed 18 comprised of a large number of relatively closely packed vertically extending bristles having their upper ends located in and defining the support surface 16. The support surface 16 is therefore penetrable by the lower end of the blade 62 as it cuts the material 14. The material 14 may consist of a single layer of sheet material or may be a lay-up of a plurality of sheets spread on top of one another.

In FIG. 1, the cutting blade 62 is shown in a raised non-cutting position. For cutting the material 14 the blade is moved downwardly from this raised position into cutting engagement with the material 14 and is reciprocated along a generally vertical reciprocation axis, perpendicular to the plane of the material 14, while it is moved along a desired line of cut by appropriate movement of the head 12 in the illustrated X and Y coordinate directions.

Part of the cutter head 12 is a tool carriage 22 supported on an X carriage 24 by two guide bars 26, 26 for movement in the illustrated Y coordinate direction. Such movement is effected by a drive belt 28 fastened to the tool carriage 22 and passing over pulleys at opposite ends of the carriage 24, one of which is powered by a suitable drive motor. At each of its opposite ends, the X carriage 24 is guided for movement relative to the surface 16 in the X coordinate direction and is driven in such direction by an associated drive mechanism (not shown).

As seen in FIG. 1, the cutter head 12 also includes a base frame 46 supported for vertical movement relative to the carriage 22 by two vertical guide rods 48, 48 fixed to the carriage by slide bearings 50, 50 fixed to the base frame and slideably receiving the rods 48, 48. In FIG. 1, the base frame 46 is shown in its raised or non-cutting position relative to the tool carriage 22. A pneumatic actuator (not shown) or similar motor moves the base frame between its lowered and raised positions. The base frame 46 is basically a U-shaped member having an upper horizontal wall 52, a lower horizontal wall 54 and a vertical wall 56.

A blade frame 58 is carried by the base frame 46 for rotation relative to the base frame about a vertical theta axis 59. The blade frame 58 in turn carries a guide 60 for the blade 62, a reciprocating mechanism 64 and the major part of the drive mechanism 66 for the reciprocating mechanism 64.

Also carried by the base frame 46 is a presser foot 68 attached to the lower ends of two vertical rods 70, 70. The rods 70, 70 are vertically slideable relative to the two horizontal walls 52 and 54 of the base frame and are limited in their downward movement relative to the base frame by a suitable stop at the upper end of each rod. A helical compression spring 74 surrounds the lower portion of each rod 70 and urges the rods and the presser foot 68 downwardly relative to the base frame.

When the base frame is in its raised position, as shown in FIG. 1, the presser foot 68 and the rods 70, 70 are in their lowermost positions with the presser foot nevertheless being raised above the surface of the underlying sheet material 14 to be cut. As the base frame is moved from its raised position to its lower cutting position the presser foot 68 is brought into engagement with the surface of the material 14 before the base frame reaches the lowermost limit of its movement and thereafter continued downward of the base frame causes the springs 74, 74 to be compressed causing the presser foot to exert a pressing force on the material 14.

For sharpening the blade 62, the tool carriage 22 has a horizontally extending wall portion 76 located below the bottom wall 54 of the base frame and supporting a sharpening mechanism, indicated generally at 78 in FIG. 1, operable to sharpen the blade 62, as explained in more detail hereinafter, when the base frame is in its non-cutting position as shown in FIG. 1.

The motor for driving the blade 62 in its reciprocating motion is indicated at 80. This motor is fixed to the base frame 46 while the reciprocating mechanism 64 rotates with the blade 62 about the theta axis 59. The output drive shaft of the motor 80 is shown at 82 and a suitable drive mechanism is provided between this shaft and the input shaft of the reciprocating mechanism 64 to permit rotation of the reciprocating mechanism about the theta axis while power is delivered to it by the motor 80 for reciprocating the cutting blade. Attached to the blade frame 58 below the horizontal wall 54 is a gear wheel 88 driven through a suitable gear train by an associated motor (not shown) to control the positioning of the blade frame 58 about the theta axis.

Turning to FIG. 2, and considering it along with FIG. 1, the sharpening mechanism 78 includes a sharpener arm 148 rigidly fixed to a hub 150 supported for rotation relative to the tool carriage wall 76 about a first vertical axis 152. Supported on the outer end of the arm 148 for rotation relative to it about a second vertical axis 154 is a sharpening wheel 156 consisting of a body having a drive groove 158 intermediate its top and bottom ends and an abrasive grit bonded to the outer surface of the body. The sharpening wheel is driven in rotation about the second vertical axis 154 by a motor 160 through a pulley 162 and an O-ring drive belt 164 engaging the wheel's groove 158. A tension spring 166 normally holds the arm 148 in a retracted position against a stop 168 as shown by the broken lines of FIG. 2. From this position, the arm is moveable to an active sharpening position, as shown by the solid lines of FIG. 2, at which the sharpening wheel is brought into engagement with the cutter blade 62. For effecting this movement of the arm 148, the sharpening mechanism 78 includes a rotary electrical solenoid actuator 170 having an output member rotatable about a vertical axis 172 and carrying a vertically extending pin 174. When the actuator is de-energized the pin 174 is biased by an internal spring to the position shown by the broken lines in FIG. 2. When the solenoid is energized, the pin rotates clockwise about the axis 172, as seen in FIG. 2, from the broken line position to the full line position and in the course of this moment engages a horizontal pin 176 fixed to the hub 150 thereby rotating the sharpener arm 148 from its retracted to its active position.

In the course of a sharpening cycle, the base frame 46 is first raised relative to the tool carriage 22 to its non-cutting position to bring the part of the blade which projects downwardly out of the guide 60 to the vertical level of the sharpening wheel 156. The blade is then rotated to the proper position about the theta axis for sharpening and the sharpening wheel is then brought into contact with it by swinging of its arm 148. During the sharpening, the blade is reciprocated, preferably at a lower stroking speed then used for cutting the sheet material 14, so that the sharpening wheel engages and sharpens the full extent of the cutting portion of the blade. The body of the wheel is generally cylindrical, although is also preferably slightly conical, the upper end being of slightly smaller diameter than the bottom end to accommodate bending of the blade which occurs as the wheel is pressed against it and to thereby cause the wheel to exert a substantially uniform sharpening effect on the blade along the entire length of the blade engaged by the wheel.

The sharpening cycles used with the cutting blade 62 are controlled by the controller (not shown) associated with the cutting machine so that as the cutting process progresses the blade is sharpened at periodic intervals to keep its cutting edge in a sharp condition. For example, the controller may be programmed to cause the mechanism to execute a sharpening cycle each time the cutting blade has cut a predetermined length of material following the preceding sharpening cycle or, as another example, a sensor may be provided to sense the rearward force imposed on the cutting blade 62 by the material 14 and the controller programmed to initiate a new sharpening cycle each time the sensed rearward force reaches a pre-determined value.

Turning now to FIGS. 3 to 9, the blade 62 consists of a piece 19 of base material coated at least partially with a thin coating 21 of hard material harder than the material of the piece 19. The materials chosen for the piece 19 and the coating 21 may vary widely, but in a preferred case the material of the base piece 19 is steel, such as M-2 steel, and the material of the coat 21 is titanium nitride. The titanium nitride or other material of the coat 21 is preferably applied to the base piece 19 by vapor deposition and has a thickness of less than 0.001 inch, the thickness preferably being in the range of 0.0001 to 0.0002 inch. The thickness of the coat 21 is in any event very much smaller than the dimensions of the base piece 19, and therefore the basic shape and dimensions of the entire blade 62 are determined by and essentially similar to that of the base piece 19.

As seen in FIGS. 3 and 4, the blade 62 is elongated along a longitudinal axis 23, which may also be its axis of reciprocation, and has a lower cutting part 17. The actual shape and size of the blade may vary widely without departing from the invention, but by way of example in the illustrated case the blade 62 is taken to be one having a length L of approximately 5¼ inch, a width W of approximately 0.200 inch and a thickness T of approximately 0.036 inch.

FIGS. 3, 4 and 6 illustrate the cutting part 17 of the blade 62 as it appears after the manufacture of the blade has been completed and before the blade has been put into use. As seen in these figures, the cutting part 17 has a forward portion 25 providing an elongated forward cutting edge 27 extending parallel to the longitudinal axis 23. Rearwardly of the forward portion 25 is a rear body portion 29 having two parallel flat side faces 30 and 31. The cutting portion 25 is defined by a first side surface 33, a second side surface 35, a third side surface 37 and a fourth side surface 39. The first side surface 33 is located in a reference plane 41 parallel to and substantially mid-way between the two side faces 30 and 31 of the body portion 29. The fourth side surface 39 is in the same plane as the body portion side face 30. The cutting edge 27 is defined by the intersection of the first side surface 33 and the second side surface 35, the second side surface being inclined to the reference plane 41 and extending from the cutting edge 27 to the fourth side surface 39. At the rear end of the first side surface 33 the third side surface extends from the first side surface 33 to the side face 31 of the body portion, the side surface 37 being inclined to the reference plane 41 preferably to about the same degree as the second side surface 35. The surfaces 35 and 37 may be either flat or slightly concave (hollow ground).

Figure 7:
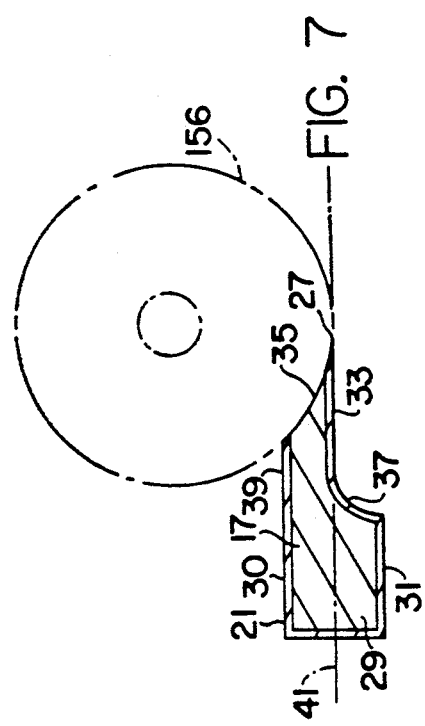
Figure 8:
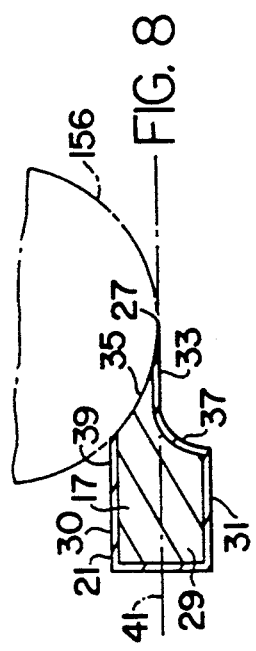
Figure 9:
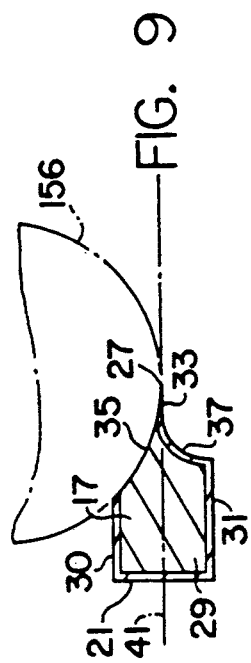

In the embodiment shown in FIGS. 5 thru 9, the base piece 19 is substantially entirely covered by the coat 21 of hard material. Therefore, when the blade is installed in a cutting head and the second surface 35 is first sharpened, the coat 21 of hard material initially covering the second surface 35 is removed, as shown in FIG. 7, so that the portion of the coat 21 overlying the first surface 33 defines the cutting edge 27. Then as cutting progresses, the second surface 35, during periodic sharpening cycles, is ground to renew as needed the sharpness of the edge 27. During each sharpening cycle some base material is removed from the surface 35, so as a result the cutting edge 27 gradually moves rearwardly as shown by FIGS. 8 and 9. Also, since the grinding wheel 156 is basically cylindrical it gives the surface 35 a slightly concave or hollow ground shape.

Furthermore, it will be evident that the cutting edge 27 remains in the middle plane 41 throughout the service life of the blade, thereby allowing the blade to cut accurately at all times. Further, as the cutting progresses the lateral force imposed by the cut material on the inclined side surface 35 is substantially exactly balanced by the lateral force imposed by the cut material on the inclined side surface 37. That is, the inclined side surface 35 deflects the cut material in one direction laterally away from the cutting edge to the plane of the side face 30, and the inclined side surface 37 deflects the cut material in the opposite direction laterally away from the cutting edge to the plane of the side face 31. Since the cutting edge is located midway between the side faces 30 and 31, these two lateral deflections of the material are of equal extent. The deflections also generally occur by compression of the material in the area located immediately adjacent the side faces of the blades. Therefore the forces exerted by the blade on the material to achieve these deflections, and the opposing forces exerted by the material on the blade, are approximately equal. Therefore, substantially no resultant force tending to bend the lower end of the blade laterally away from the axis 23, and arising from the shape of the blade, is imposed on the blade at any point in its service life.

It will also be understood that it is not essential to have all of the surfaces of the base piece 19 covered with the coating 21 of hard material. Instead, in order to have the cutting edge defined by the hard material, it is sufficient if only the first side surface 33 is covered with such hard material in the unused condition of the blade. Also, it is intended that the shape of blade disclosed herein may be used in some instances without providing any cast of hard material on any part of the base material. In this case the blade will be constructed solely of the base material, so that the cutting edge will be defined by the base material alone rather than by the material of any hard coat. The blade will however have the advantage of the cutting edge remaining on the middle reference plane while only the second side surface is ground for sharpening purposes, and will also have the advantage of substantially balanced lateral forces being imposed on the blade throughout its service life by the material being cut.

I claim:

1. A method for cutting sheet material, said method comprising the steps of:

providing a cutting blade comprised of an elongated piece of base material having a lower cutting part extending along a longitudinal axis which cutting part has a forward cutting edge providing portion and a rear body portion, said body portion having first and second generally flat side faces parallel to and spaced from one another, said cutting edge providing portion having first, second, third and fourth side surfaces, said first side surface being located on a middle reference plane parallel to and located substantially mid-way between said first and second side faces of said body portion, said fourth side surface being located in the same plane as the first side face of said body portion, said second side surface being inclined relative to said reference plane, extending between said first side surface and said fourth side surface and intersecting said first side surface to define a cutting edge extending parallel to said longitudinal axis, and said third side surface extending from the rear of said first side surface to said second side face of said body portion and being inclined relative to said reference plane, at least said first side surface of said cutting edge providing portion being covered with a thin layer of hard material harder than that of said base material, providing a quantity of sheet material spread on and supported by a supporting surface, cutting said sheet material by reciprocating said blade along an axis of reciprocation generally parallel to said longitudinal axis and generally perpendicular to said sheet material and moving said blade forwardly along a desired line of cut to cut said sheet material while said cutting edge is in cutting engagement with said sheet material, and periodically sharpening said cutting portion of said blade by grinding only said second side surface so as to cause said cutting edge to be defined substantially entirely by said hard material, said cutting edge as a result of repeated grindings of said second side surface gradually moving rearwardly toward said body portion and remaining on said middle reference plane.

2. A method for cutting sheet material as defined in claim 1 further characterized by said step of periodically sharpening said blade being carried out by grinding said second side surface with a generally cylindrical grinding wheel having an axis of symmetry and rotation substantially parallel to said longitudinal axis and as a result of which said second side surface is given a concave shape through the action of said grinding wheel.

* * * * *